US010783931B1

(12) United States Patent
Mercer-Taylor

(10) Patent No.: US 10,783,931 B1
(45) Date of Patent: Sep. 22, 2020

(54) ROBOTIC DEVICE MOVEMENT OPTIMIZATION IN DATA STORAGE LIBRARY SYSTEMS

(71) Applicant: Amazon Technologies, Inc., Seattle, WA (US)

(72) Inventor: Andrew James Mercer-Taylor, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/447,843

(22) Filed: Jun. 20, 2019

(51) Int. Cl.
*G11B 33/04* (2006.01)
*G05B 19/4155* (2006.01)
*G05B 19/416* (2006.01)

(52) U.S. Cl.
CPC ........ *G11B 33/0405* (2013.01); *G05B 19/416* (2013.01); *G05B 19/4155* (2013.01); *G05B 2219/45057* (2013.01); *G05B 2219/45177* (2013.01)

(58) Field of Classification Search
CPC ............ G11B 33/0405; G11B 19/4155; G05B 19/416; G05B 2219/45057; G05B 2219/45177
USPC ........................................................ 360/92.1
See application file for complete search history.

(56) References Cited

U.S. PATENT DOCUMENTS

| | | | | |
|---|---|---|---|---|
| 7,199,967 | B2 * | 4/2007 | Benson | G11B 17/22 360/96.4 |
| 2003/0113191 | A1 * | 6/2003 | Smith | G11B 17/225 360/92.1 |
| 2003/0113193 | A1 * | 6/2003 | Ostwald | G11B 33/125 360/92.1 |
| 2003/0123341 | A1 * | 7/2003 | Ostwald | G11B 17/225 360/92.1 |
| 2004/0202062 | A1 * | 10/2004 | Ostwald | G11B 17/225 360/92.1 |
| 2008/0186614 | A1 * | 8/2008 | Kotaki | G11B 15/6835 360/69 |
| 2008/0192381 | A1 * | 8/2008 | Minemura | G11B 15/6885 360/137 |
| 2009/0225468 | A1 * | 9/2009 | Goodman | G11B 15/688 360/92.1 |

* cited by examiner

*Primary Examiner* — Allen T Cao
(74) *Attorney, Agent, or Firm* — Davis Wright Tremaine LLP

(57) ABSTRACT

An archival data storage service dispatches a first robotic device of a data storage library to perform a first task that involves moving a first data storage tape from a tape drive to a slot of the data storage library. The service select a second task to be performed by a second robotic device, which can be performed without the first robotic device causing delay of the second task. While the first robotic device is performing the first task, the archival data storage service dispatches the second robotic device to perform the second task.

20 Claims, 10 Drawing Sheets

ROBOTIC DEVICE MOVEMENT OPTIMIZATION IN DATA STORAGE LIBRARY SYSTEMS

BACKGROUND

Computing resource service providers and other service providers often rely on archival data storage devices to maintain archive records, backup files, medial files and the like for their customers. For instance, many organizations utilize these archival data storage devices for the purpose of data archiving, data redundancy, and the storage of large amounts of data. These archival data storage devices may be maintained within data storage libraries, which may maintain these archival data storage devices in physical racks within an enclosure. Further, this enclosure may include a set of storage device readers, which may be used to obtain data from an archival data storage device. The movement of these archival data storage devices within the enclosure of a data storage library may be performed using a set of robotic devices that move within the enclosure to retrieve an archival data storage device, introduce an archival data storage device into a storage device reader, remove an archival data storage device from a storage device reader, and store an archival data storage device within any of the physical racks within the enclosure. However, optimizing the movement of these robotic devices within the enclosure to efficiently perform operations using these archival data storage devices without increasing the risk of collisions among the robotic devices can be difficult.

BRIEF DESCRIPTION OF THE DRAWINGS

Various techniques will be described with reference to the drawings, in which.

DETAILED DESCRIPTION

Figure 1:
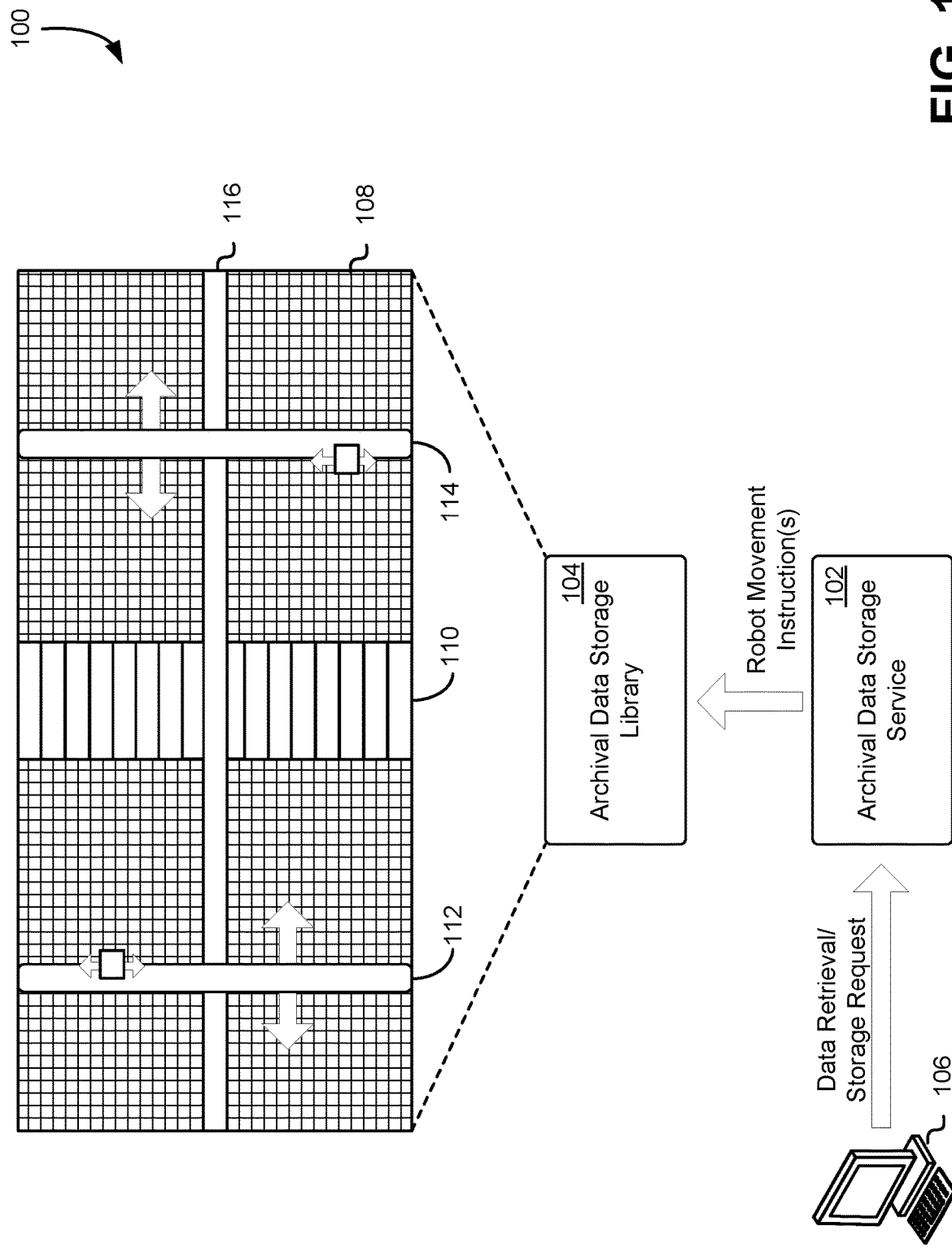
FIG. 1 shows an illustrative example of a system in which various embodiments can be implemented.

Techniques described and suggested herein relate to a computer system for optimizing the movement operations of a set of robotic devices within a data storage library to improve the efficiency in moving archival data storage devices within the data storage library. In an example, an archival data storage service obtains a request to perform an operation that involves movement of an archival data storage device maintained within a data storage library of the archival data storage service. For instance, a customer of the archival data storage service may submit a request to the archival data storage service to obtain data that may be stored within one or more data storage devices within the data storage library. Alternatively, a customer of the archival data storage service may submit a request to the archival data storage service to store data within the data storage library. In response to the request, the archival data storage service may identify which archival data storage devices from the data storage library are to be utilized for fulfillment of the request. Further, the archival data storage service may identify the location of the archival data storage devices within the data storage library. For instance, the archival data storage service may identify the particular rack position (e.g., through vertical and horizontal coordinates within the library, etc.) for each of the archival data storage devices to be utilized for fulfillment of the request.

In an example, the archival data storage service adds the request, as well as the location information for the one or more archival data storage devices to be used for fulfillment of the request, in a queue accessible by a robotic device command module that may transmit executable instructions to the robotic devices of the data storage library to cause the robotic devices to perform various movement operations within the data storage library. In an example, the archival data storage service orders the requests specified in the queue based on any priority requirements for the requests imposed by customers of the archival data storage service. For instance, if a customer has imposed a requirement that a request is to be fulfilled by a particular time, the archival data storage service may prioritize the request within the queue such that the request is processed from the queue prior to the particular time.

In an example, the robotic device command module obtains, from the queue, a request and location information for the one or more archival data storage devices to be used for fulfillment of the request. Additionally, the robotic device command module may obtain location information for the robotic devices within the data storage library to determine the location of each of the robotic devices. Based on the parameters of the request (e.g., location of archival data storage devices to be utilized for fulfillment of the request, any ordering of operations to be performed using the archival data storage devices, etc.), the current location of the robotic devices, and the storage location for other archival data storage devices to be removed from storage device readers in the data storage library to accommodate the archival data storage devices to be used for fulfillment of the request, the robotic device command module may determine optimal movement operations for the robotic devices that may be performed to fulfill the request. For instance, the robotic device command module may calculate a set of movement operations for each robotic device that are optimized to reduce the amount of time utilized to fulfill the request while preventing any collisions among the robotic devices during execution of the set of movement operations. The robotic device command module may transmit executable instructions to the robotic devices to cause the robotic devices to perform these operations.

In an example, a data storage system of the data storage library obtains the executable instructions from the robotic device command module and predicts the movement of the robotic devices based on the executable instructions and the current operations being performed by the robotic devices. Based on these predictions, the data storage system may determine whether a collision among the robotic devices would occur if the executable instructions were to be executed by the robotic devices within the data storage library. If the data storage system determines that a collision will occur as a result of execution of the executable instructions, the data storage system may transmit a collision warning to the robotic device command module. This may cause the robotic device command module to re-calculate an optimal movement strategy for the robotic devices and determine whether this new strategy, if executed, would result in fulfillment of the request subject to any constraints imposed on the request (e.g., time limitations, etc.). Alternatively, if the robotic device command module determines, as a result of the collision warning, that the request can no longer be fulfilled, the robotic device command module may transmit a notification indicating that the request cannot be fulfilled.

If the data storage system determines that the executable instructions can be executed without any collisions, the data storage system may cause the robotic devices to execute the executable instructions and perform the operations required for fulfillment of the request. In an example, the data storage system transmits a notification to the robotic device command module to indicate that the executable instructions are being executed. This may cause the robotic device command module to process another request from the queue. Thus, the data storage system may process incoming executable instructions from the robotic device command module and cause the robotic devices to fulfill various operations according to the optimal movement strategy defined by the robotic device command module.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, because the data storage system of the data storage library evaluates incoming executable instructions to determine whether a collision would occur if the executable instructions were to be executed, the data storage system may prevent any collisions among the robotic devices from occurring during execution of any executable instructions. Further, because the robotic device command module develops an optimal movement strategy based on the current position of the robotic devices and the parameters of the request, the robotic device command module may reduce the amount of time required for fulfillment of the request, as the movement strategy is developed such that the robotic devices maximize their respective movement efficiency in storing archival data storage devices within the library and placing other archival data storage devices within the data storage device readers at the same time.

FIG. 1 shows an illustrative example of a system 100 in which various embodiments can be implemented. In the system 100, an archival data storage service 102 obtains a request from a customer, through a client device 106, to perform one or more archival data storage operations. For instance, the customer may submit a request to retrieve data that may be stored within an archival data storage library 104 maintained by the archival data storage service 102. Alternatively, the customer may submit a request to store data within an archival data storage library 104. The archival data storage service 102 may comprise a collection of computing resources that collectively operate to provide storage for data archiving and backup of customer data. The data may comprise one or more data files that may be combined to form an archive. The archival data storage service 102 may persistently store data that may be infrequently accessed and for which long retrieval times are acceptable to a customer utilizing the archival data storage service 102. A customer may interact with the archival data storage service 102 (for example, through application programming interface (API) calls made to the archival data storage service 102) to generate one or more archives, upload and retrieve the one or more archives or monitor the generation, upload or retrieval of the one or more archives.

In response to the request, the archival data storage service 102 identifies which archival data storage devices maintained within the archival data storage library 104 are to be utilized for fulfillment of the request. For instance, the archival data storage service 102 may maintain a database that includes entries corresponding to data stored within the archival data storage library 104. Example archival data storage libraries may include the Scalar® i3, Scalar® i6, and Scalar® i6000 tape storage libraries manufactured by Quantum®. The archival data storage devices may include magnetic cassettes (which may contain magnetic tapes), magnetic disk storage or other magnetic storage devices, solid-state storage devices, or any other media which can be used to store data and which can be accessed by a drive, such as a device data station (described in greater detail below), tape drive, and the like. The request obtained from the client device 106 may include an identifier corresponding to data stored within the archival data storage library 104. In an embodiment, the archival data storage service 102 queries, using the provided identifier, the database to identify an entry corresponding to the data that is to be retrieved from the archival data storage library 104. The entry may specify identifiers corresponding to the one or more archival data storage devices maintained within the archival data storage library 104 that are used to store the data. Further, the entry may specify the physical location of these archival data storage devices within the archival data storage library 104.

For instance, the entry may specify an address (e.g., coordinates, vectors, etc.) of a physical storage location within the archival data storage library 104 where an archival data storage device may be stored. This database may be updated by the archival data storage service 102 using input from a data storage system of the archival data storage library 104 generated as archival data storage devices are moved within the archival data storage library 104 for fulfillment of requests.

In an embodiment, if the request from the client device 106 is to store data within one or more archival data storage devices of the archival data storage library 104, the archival data storage service 102 may query the database to identify which archival data storage devices may be used to store the data. For instance, the archival data storage service 102 may select one or more archival data storage devices based on various criteria including, but not limited to: proximity to other archival data storage devices used to store data of the customer, available storage capacity within the archival data storage devices, redundancy required to avoid correlated failures, and the like. If the archival data storage service 102 identifies one or more archival data storage devices that may be used to store the data, the archival data storage service 102 may identify the physical location of these archival data storage devices within the archival data storage library 104. It should be noted that while a database comprising entries keyed off of identifiers corresponding to individual data sets stored within the archival data storage library 104 is utilized extensively throughout the present disclosure for the purpose of illustration, the database may be organized using entries corresponding to individual archival data storage devices. For instance, the archival data storage service 102 may query, using an identifier of an archival data storage device, the database to identify an entry corresponding to this archival data storage device. The entry may specify what data is stored within the archival data storage device.

In an embodiment, the archival data storage service 102 determines whether the request requires prioritization for fulfillment. For instance, a customer may specify that the request is to be fulfilled within a certain amount of time in order to meet the customer's requirements for data availability. If the archival data storage service 102 determines that the request is to be prioritized, the archival data storage service 102 may add the request to a queue of pending requests in a position commensurate with its prioritization. For example, the archival data storage service 102 may prioritize the request in the queue such that the request is processed prior to other pending requests that may have been previously added to the queue. In an embodiment, the queue is utilized by a robotic device command module (described in greater detail below) of the archival data storage service 102 to determine what operations are to be performed within the archival data storage library 104 for fulfillment of the request. If the request does not require prioritization, the archival data storage service 102 may add the request to the queue, along with identifiers corresponding to the archival data storage devices that are to be used for data retrieval or storage. The entry in the queue may also specify coordinates or other location information corresponding to the physical location of these one or more archival data storage devices within the archival data storage library 104.

The archival data storage library 104 may comprise a data storage system or other computing system that may store, organize, and access a plurality of archival data storage devices that are used to store data associated with archives using robotic devices 112, 114, which may be automatically operated. In an embodiment, the archival data storage devices are allocated to, and stored in, slots 108 within one or more physical racks of the archival data storage library 104. In response to a request for data, the data storage system may determine which archival data storage devices to retrieve in accordance with the request. The data storage system may further determine the location of one or more of the slots 108 storing the identified archival data storage devices and, using the robotic devices 112, 114, cause retrieval of those archival data storage devices from the slots 108 so as to place them in proximity of a device data station 110 of the archival data storage library 104. A device retrieval unit associated with the device data station (e.g., attached) selects or "picks" the appropriate data storage devices in accordance with the request and manipulates the selected data storage devices so as to enable the device data station to read and/or write the requisite data to/from the data storage devices in accordance with the aforementioned data request. After the data operation is complete, the data storage devices are returned to the same or different slot from whence they were retrieved.

In an embodiment, the archival data storage library 104 comprises a robotic device track 116 through which robotic devices 112, 114 can move across the archival data storage library 104 along an axis to retrieve archival data storage devices from slots 108, place archival data storage devices in proximity of a device data station 110, and to return the archival data storage devices to the same or different slot from whence they were retrieved. As illustrated in FIG. 1, the robotic device track 116 may span the archival data storage library 104 along a horizontal axis such that the robotic devices 112, 114 can move along the span of the archival data storage library 104 in along the horizontal axis. The robotic devices 112, 114 may also include individual tracks that allow movement of the robotic devices 112, 114 along a vertical axis within the archival data storage library 104. Thus, the robotic device track 116 and the individual tracks of the robotic devices 112, 114 may form an "H-frame" configuration for the archival data storage library 104. It should be noted that while a robotic device track 116 situated along a horizontal axis is used throughout the present disclosure for the purpose of illustration, other tracks along other axes may be used to enable movement of the robotic devices 112, 114 along any vector within the archival data storage library 104 (e.g., vertical track movement, orthogonal track movement, diagonal track movement, etc.). The data storage system, in an embodiment, monitors movement of the robotic devices 112, 114 within the archival data storage library 104 to ensure that the robotic devices 112, 114 do not collide as they perform various operations to fulfill a request and move along the horizontal axis via the robotic device track 116. For instance, based on the location of a first robotic device 112, the data storage system may ensure that the second robotic device 114 does not move in a manner that would cause a collision with the first robotic device 112. Similarly, based on the location of the second robotic device 114, the data storage system may ensure that the first robotic device 112 does not move in a manner that would cause a collision with the second robotic device 114.

In an embodiment, the robotic device command module of the archival data storage service 102 identifies a pending request from the queue and obtains, from the data storage system of the archival data storage library 104, the current position of each of the robotic devices 112, 114 operating within the archival data storage library 104. The robotic device command module may maintain a communications channel with the data storage system, through which position information for each of the robotic devices 112, 114 may be streamed to the robotic device command module. Using this position information, as well as the location information for the archival data storage devices to be used to fulfill the request, the robotic device command module may determine whether the request can be fulfilled without causing a collision among the robotic devices 112, 114. For instance, the robotic device command module may determine the physical location of the first robotic device 112 and of the second robotic device 114 within the archival data storage library 104. Using this information, along with the location information for an archival data storage device to be used for performance of the data operation, the robotic device command module may determine which robotic device 112, 114 may obtain the archival data storage device and place the archival data storage device within a device data station 110 for fulfillment of the request. For example, the robotic device command module may identify what movements the first robotic device 112 may be performing to dynamically determine the movement range of the second robotic device 114 as the first robotic device 112 executes its movements. Based on this movement range, the robotic device command module may determine whether the second robotic device 114 can access the archival data storage device and place it within a device data station 110 for fulfillment of the request without colliding with the first robotic device 112 as the robotic devices 112, 114 perform their respective operations.

It should be noted that while collisions are described extensively throughout the present disclosure for selecting a request that may be fulfilled by a robotic device, other considerations may be utilized for selection of the request. For example, in an embodiment, the robotic device command module selects, from a plurality of requests or tasks that are to be performed in the data storage library, a set of operations or tasks of a request to be performed by a robotic device, whereby these operations or tasks may be performed by the robotic device without another robotic device causing delay of the performance of the set of operations or tasks by the robotic device. For instance, the robotic device command module may determine whether operations or tasks that may be performed by the robotic device would cause the robotic device to enter a region of the library in which the other robotic device is operating, resulting in possible interference among the robotic devices. If the robotic device command module determines that the robotic device would not enter into the region of the library in which the other robotic device is operating, the robotic device command module may determine that the request may be fulfilled.

If the robotic device command module determines that the request cannot be fulfilled due to the likelihood of a collision occurring among the robotic devices 112, 114, the robotic device command module may determine whether the queue may be reordered (e.g., the request is re-added to the queue in a different position). For example, if the request is subject to one or more time constraints for fulfillment, the robotic device command module may determine whether processing the request may be delayed until such time that it may be fulfilled with no risk of collision among the robotic devices 112, 114. If the request cannot be re-added to the queue (e.g., the one or more time constraints cannot be satisfied), the robotic device command module may indicate that the request cannot be fulfilled within the specified time constraints. However, if the request can be delayed, the robotic device command module may re-add the request to the queue and select the next request from the queue. If the robotic device command module determines that the request can be fulfilled without causing a collision among the robotic devices 112, 114, the robotic device command module may generate executable instructions that, if executed by a robotic device 112, 114, may cause the robotic device 112, 114 to perform a set of operations for fulfillment of the request. For instance, the executable instructions may cause a robotic device to move along the robotic device track 116 to a location where an archival data storage device that is to be used for fulfillment of the request is located, obtain the archival data storage device, and move along the robotic device track 116 to a device data station 110 to place the archival data storage device. The robotic device command module may transmit these executable instructions to the data storage system of the archival data storage library 104 for execution.

In response to obtaining the executable instructions from the robotic device command module, the data storage system may evaluate these executable instructions to predict the movements of the robotic devices 112, 114 and determine whether a collision will occur if the executable instructions are executed by a robotic device. For instance, the data storage system may simulate execution of the executable instructions and determine whether the movements of a robotic device would result in a collision between the robotic device and the other robotic device within the archival data storage library 104 that may simultaneously be performing other movements. If a collision is likely to occur, the data storage system may transmit a notification to the robotic device command module to provide a collision warning. This may cause the robotic device command module to re-add the request to the queue if possible, as described above. However, if the executable instructions may be executed without causing a collision, the data storage system may execute the executable instructions on the selected robotic device to cause the robotic device to perform the operations required for fulfillment of the request.

In an embodiment, the robotic device command module monitors execution of the executable instructions to detect completion of a job by a robotic device 112, 114. If the robotic device command module detects that a robotic device 112, 114 has completed a particular job, the robotic device command module may obtain information usable to identify an area of potential collision with the other robotic device operating within the archival data storage library 104. For instance, the robotic device command module may identify the pending movement operations for the other robotic device and determine the movement range for the robotic device as the movement operations are being performed by the other robotic device. Based on this identified area, the robotic device command module may determine whether the next request in the queue may be completed by the robotic device within the area of potential collision. If the request cannot be completed due to a risk of collision, the robotic device command module may wait for a period of time (subject to any time restraints imposed by the requestor) to allow for the other robotic device to perform movement operations that may result in a change in the area of potential collision with this other robotic device.

If the request from the queue is completable within the area of potential collision and without any risk of collision, the robotic device command module may generate executable instructions that, if executed, cause the robotic device to perform a set of operations within the area of potential collision for fulfillment of the request. Further, the robotic device command module may dispatch these executable instructions to the data storage system of the archival data storage library 104 to cause the robotic device to execute the set of executable instructions and perform the operations within the area of potential collision. This may allow the robotic devices 112, 114 of the archival data storage library 104 to concurrently be performing operations within the archival data storage library 104 without causing any collisions among these robotic devices 112, 114.

Figure 2:
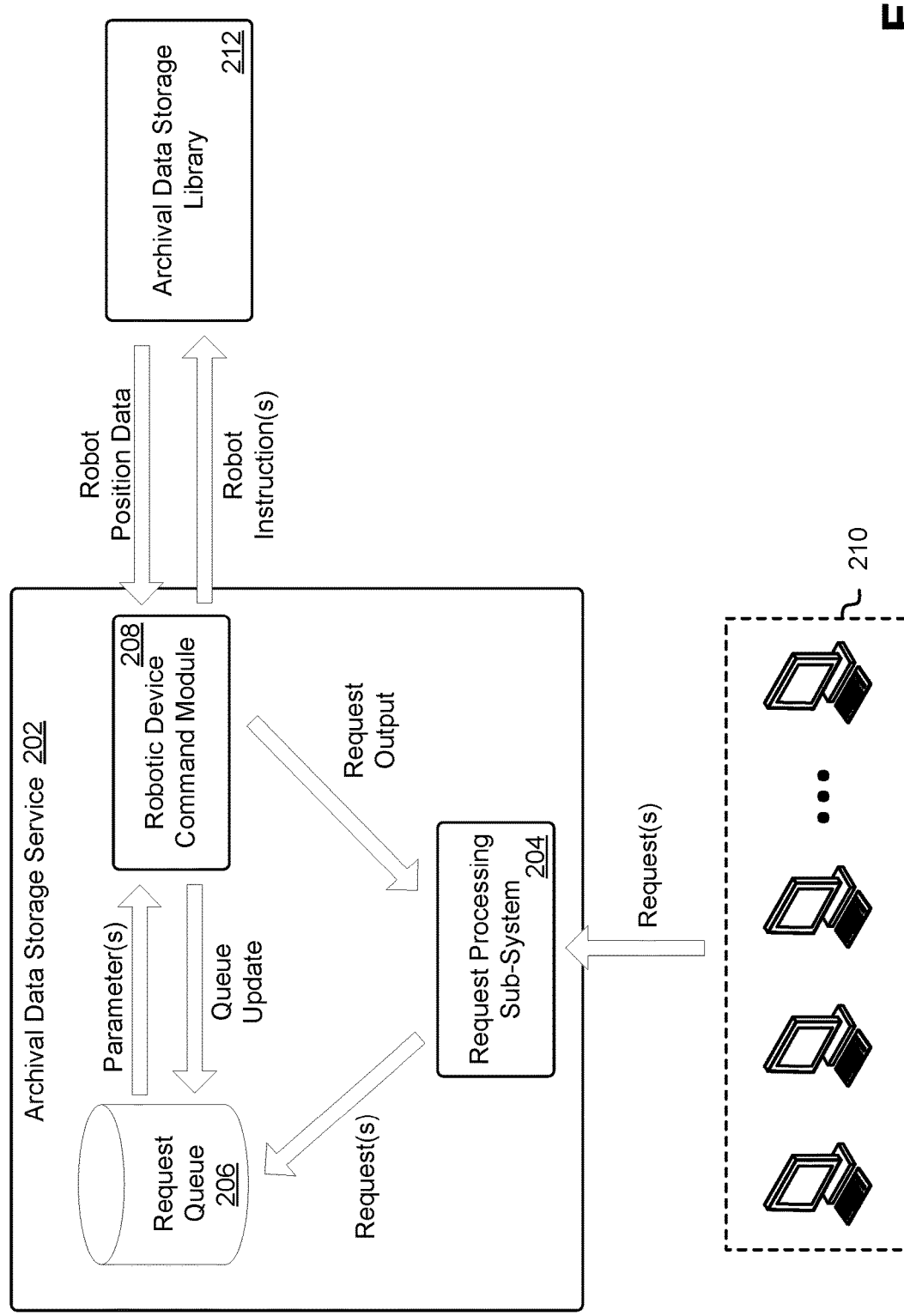
FIG. 2 shows an illustrative example of a system in which an archival data storage service transmits executable instructions to a data storage system of an archival data storage library to cause a robotic device to perform a set of operations in accordance with at least one embodiment.

FIG. 2 shows an illustrative example of a system 200 in which an archival data storage service 202 transmits executable instructions to a data storage system of an archival data storage library 212 to cause a robotic device to perform a set of operations in accordance with at least one embodiment. In the system 200, a request processing sub-system 204 of the archival data storage service 202 may obtain a set of requests from one or more client devices 210 to perform data storage operations within the archival data storage library 212. For instance, a customer, through a client device 210, may submit a request to the request processing sub-system 204 to obtain data stored within one or more data storage devices maintained by the archival data storage library 212. This request may include an identifier corresponding to the data that is to be retrieved. Alternatively, a customer, through a client device 210, may submit a request to store data within the archival data storage library 212. This request may specify parameters of the data, as well as any requirements for storage of the data (e.g., redundancy requirements, storage device selections, etc.). The request processing sub-system 204 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

In an embodiment, the request processing sub-system 204 evaluates each of the obtained requests to identify which archival data storage devices maintained by the archival data storage library 212 are to be utilized for fulfillment of the requests. For instance, if a request specifies that particular data is to be retrieved from the archival data storage library 212, the request processing sub-system 204 may determine which archival data storage devices have this particular data stored therein. Alternatively, if a request specifies that data is to be stored within the archival data storage library 212, the request processing sub-system 204 may identify one or more archival data storage devices that may be used to store the data within the archival data storage library 212.

In an embodiment, the request processing sub-system 204 evaluates the obtained requests to determine whether any of the obtained requests require prioritization for fulfillment. For instance, a customer may specify that the request is to be fulfilled within a certain amount of time in order to meet the customer's requirements for data availability. If the request processing sub-system 204 determines that a request is to be prioritized, the request processing sub-system 204 may add the request to a queue 206 of pending requests in a position commensurate with its prioritization. Other requests that have no prioritization requirements may be added to the queue 206 in an order in which they were received. For instance, the queue 206 may be organized using a "first in, first out" (FIFO) ordering such that earlier obtained requests are processed before later obtained requests. However, as noted above, this FIFO ordering may be modified based on the prioritization requirements for a request obtained from a client device 210 such that a request having a prioritization requirement is processed prior to other requests that do not have such a requirement. The request processing sub-system 204 may add the requests obtained from the client devices 210 to the queue 206, along with identifiers corresponding to the archival data storage devices that are to be used for data retrieval or storage. The entries in the queue 206 may also specify coordinates or other location information corresponding to the physical location of these one or more archival data storage devices within the archival data storage library 212.

In an embodiment, the queue 206 is utilized by a robotic device command module 208 of the archival data storage service 202 to determine what operations are to be performed within the archival data storage library 212 for fulfillment of the request. The robotic device command module 208 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The robotic device command module 208 may obtain, from the queue 206, request parameters corresponding to a request obtained from a client device 210. The request parameters may include the operations to be performed (e.g., data retrieval, data storage, etc.) as well as identifiers corresponding to the archival data storage devices to be used for performance of the operations and any location information that specifies the physical location of each of the archival data storage devices within the archival data storage library 212.

It should be noted that while queues are utilized extensively throughout the present disclosure for the purpose of illustration, other techniques may be used to make requests available to the data storage system of the archival data storage library 212. For instance, in an embodiment, the data storage system of the archival data storage library 212 transmits a notification to the robotic device command module 208 to indicate that a robotic device is available for performing operations within the archival data storage library 212. In response to this notification, the robotic device command module 208 may transmit this notification to the request processing sub-system 204. The request processing sub-system 204 may communicate with various client devices 210 to determine whether any of these client devices 210 have a request available that may be fulfilled using the available robotic device within the archival data storage library 212. Thus, rather than maintaining requests within the request queue 206, the request processing sub-system 204 may obtain a request from a client device 210 in response to an indication that a robotic device is available for fulfillment of the request.

As another alternative to the request queue 206, the archival data storage service 202 may store the various requests obtained from the client devices 210 through the request processing sub-system 204 in a repository or other datastore. The requests may be organized based on different categories (e.g., operation to be performed, amount of data to be retrieved or stored, etc.). The robotic device command module 208 may obtain a request from this repository or other datastore based on the position data for each robotic device operating within the archival data storage library 212 and other information that may be used to determine what operations may be performed within the archival data storage library 212. This information may be used to determine what category of requests may be fulfilled and, based on this determination, to select a request for fulfillment.

In an embodiment, the robotic device command module 208 obtains, from a data storage system of the archival data storage library 212, position data for each robotic device operating within the archival data storage library 212. For instance, the robotic device command module 208 may maintain a communications channel with the data storage system, through which position data for each of the robotic devices may be streamed to the robotic device command module 208. Using this position data, as well as the location information for the archival data storage devices to be used to fulfill the request, the robotic device command module 208 may determine whether the request can be fulfilled without causing a collision among the robotic devices. For instance, the robotic device command module 208 may determine the physical location of a first robotic device and of a second robotic device within the archival data storage library 212. Using this information, along with the location information for an archival data storage device to be used for performance of the data operation, the robotic device command module may determine which robotic device may obtain the archival data storage device and place the archival data storage device within a device data station for fulfillment of the request.

As an illustrative example, the robotic device command module 208 may identify what movements a first robotic device may be performing to dynamically determine the movement range of a second robotic device as the first robotic device executes its movements within the library 212. Based on this movement range, the robotic device command module 208 may determine whether the second robotic device can access the archival data storage device and place it within a device data station for fulfillment of the request without colliding with the first robotic device as the robotic devices perform their respective operations. If the robotic device command module 208 determines that a collision is likely to occur if a robotic device were to execute a set of movement operations for fulfillment of the request, the robotic device command module 208 may determine whether the request can be re-added to the queue 206 for later processing. For instance, if the request is not subject to any prioritization requirements, the robotic device command module 208 may re-add the request to the queue 206 such that the request may be processed at a later time. However, if the request is subject to one or more prioritization requirements, the robotic device command module 208 may determine whether the request may be re-added to the queue 206 and processed at a later time subject to the prioritization requirements. This may cause the robotic device command module 208 to re-add the request in a position within the queue 206 that would enable the robotic device command module 208 to re-evaluate the request and potentially fulfill the request in accordance with the prioritization requirements. However, if the robotic device command module 208 determines that the request cannot be fulfilled, the robotic device command module 208 may transmit a notification to the request processing sub-system 204 to indicate that the request cannot be fulfilled.

If the robotic device command module 208 determines that the request can be fulfilled without causing a collision among the robotic devices of the archival data storage library 212, the robotic device command module 208 may transmit executable instructions to the archival data storage library 212 that, if executed by the data storage system or a robotic device of the archival data storage library 212, causes the robotic device to perform a set of operations and corresponding movements for fulfillment of the request. In response to obtaining the executable instructions from the robotic device command module 208, the data storage system of the archival data storage library 212 may perform an evaluation of these executable instructions to determine whether execution of these executable instructions would result in a collision among the robotic devices of the archival data storage library 212. For instance, the data storage system may simulate execution of the executable instructions and determine whether the movements of a robotic device would result in a collision between the robotic device and another robotic device within the archival data storage library 212 that may simultaneously be performing other movements. If a collision is likely to occur, the data storage system may transmit a notification to the robotic device command module 208 to provide a collision warning. This may cause the robotic device command module 208 to re-add the request to the queue 206, if possible. However, if the executable instructions may be executed without causing a collision, the data storage system may execute the executable instructions on the selected robotic device to cause the robotic device to perform the operations required for fulfillment of the request.

As described above, the robotic device command module 208 may monitor execution of the executable instructions to detect completion of a job by a robotic device. If the robotic device command module 208 detects that a robotic device has completed a particular job, the robotic device command module 208 may obtain information usable to identify an area of potential collision with the other robotic device operating within the archival data storage library 212. This information may be obtained over the communications channel established between the robotic device command module 208 and the data storage system of the archival data storage library 212. The data storage system may continuously stream this information to the robotic device command module 208 as the robotic devices perform various movement operations within the archival data storage library 212.

Using this information, the robotic device command module 208 may identify the pending movement operations for the other robotic device and determine the movement range for the robotic device that is to execute the executable instructions as the pending movement operations are being performed by the other robotic device. Based on this identified area of potential collision identified by the robotic device command module 208, the robotic device command module 208 may determine whether the next request in the queue 206 may be completed by the robotic device within the area of potential collision. If the request cannot be completed due to a risk of collision, the robotic device command module 208 may wait for a period of time (subject to any time restraints imposed by the requestor) to allow for the other robotic device to perform movement operations that may result in a change in the area of potential collision with this other robotic device. The robotic device command module 208 may continue to monitor performance of these pending movement operations and re-evaluate the request to determine whether the executable instructions may be executed without causing a collision among the robotic devices.

If the request from the queue 206 is completable within the area of potential collision and without any risk of collision, the robotic device command module 208 may generate executable instructions that, if executed, cause the robotic device to perform a set of operations within the area of potential collision for fulfillment of the request. Further, the robotic device command module 208 may transmit these executable instructions to the data storage system of the archival data storage library 212 to cause the data storage system to dispatch the robotic device for execution of the set of executable instructions and for performance of the operations within the area of potential collision. This may allow the robotic devices of the archival data storage library 212 to concurrently perform operations within the archival data storage library 212 without causing any collisions among these robotic devices.

Figure 3:
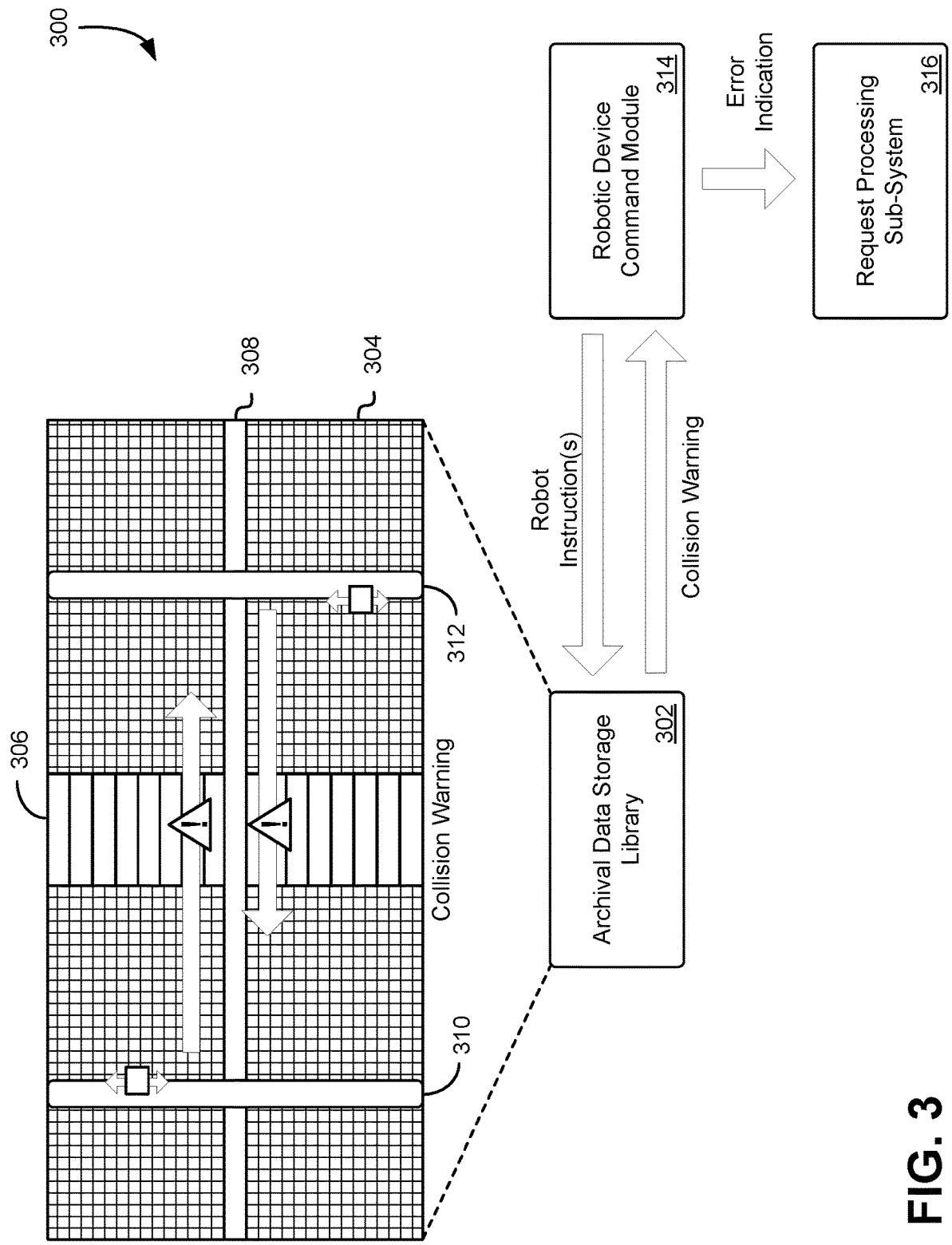
FIG. 3 shows an illustrative example of a system in which a data storage system of the archival data storage library provides an indication of a collision warning based on an evaluation of executable instructions obtained from a robotic device command module of the archival data storage service in accordance with at least one embodiment.

FIG. 3 shows an illustrative example of a system 300 in which a data storage system of the archival data storage library 302 provides an indication of a collision warning based on an evaluation of executable instructions obtained from a robotic device command module 314 of the archival data storage service in accordance with at least one embodiment. In the system 300, the data storage system obtains a set of executable instructions that, if executed by the data storage system or by a robotic device 310, 312, causes a robotic device 310, 312 to perform a set of movement operations within the archival data storage library 302 for fulfillment of a data storage request from a customer of the archival data storage service.

In response to obtaining the executable instructions from the robotic device command module 314, the data storage system of the archival data storage library 302 may evaluate the executable instructions to determine whether execution of these executable instructions would result in a collision among the robotic devices 310, 312 of the archival data storage library 302. For instance, the data storage system may determine, for a first robotic device 310, the movement operations along the robotic device track 308 for accessing slots 304 of the archival data storage library 302 to obtain archival data storage devices, placement of archival data storage devices within device data stations 306 of the archival data storage library 302, and/or storage of the archival data storage devices within the slots 304 during a period in which the executable instructions would be executed by a second robotic device 312. Based on these movement operations, the data storage system may identify the movement zones for each of the robotic devices 310, 312, which may dynamically change as the movement operations are being performed by the first robotic device 310.

In an embodiment, if the data storage system of the archival data storage library 302 determines that a collision among the robotic devices 310, 312 would occur as a result of execution of the executable instructions, the data storage system generates a collision warning to indicate that execution of these executable instructions will result in a collision and, as a result, cannot be executed by the data storage system. The data storage system may transmit the collision warning to the robotic device command module 314, which may determine whether the corresponding request, which was used to generate the executable instructions, can still be fulfilled. For instance, the robotic device command module 314 may determine whether the request can be re-added to the queue for later processing. For instance, if the request is not subject to any prioritization requirements, the robotic device command module 314 may re-add the request to the queue such that the request may be processed at a later time.

However, if the request associated with the executable instructions is subject to one or more prioritization requirements, the robotic device command module 314 may determine whether the request may be re-added to the queue and processed at a later time subject to the prioritization requirements. This may cause the robotic device command module 314 to re-add the request in a position within the queue that would enable the robotic device command module 314 to re-evaluate the request and potentially fulfill the request in accordance with the prioritization requirements. However, if the robotic device command module 314 determines that the request cannot be fulfilled, the robotic device command module 314 may transmit a notification to the request processing sub-system 316 to indicate that the request cannot be fulfilled. This notification may include an error indication that specifies the nature of the likely collision among the robotic devices 310, 312 if the executable instructions were to be executed by the data storage system. The request processing sub-system 316 may, in turn, transmit a notification to the customer that submitted the request to indicate that the request cannot be fulfilled subject to the prioritization requirements imposed by the customer.

Figure 4:
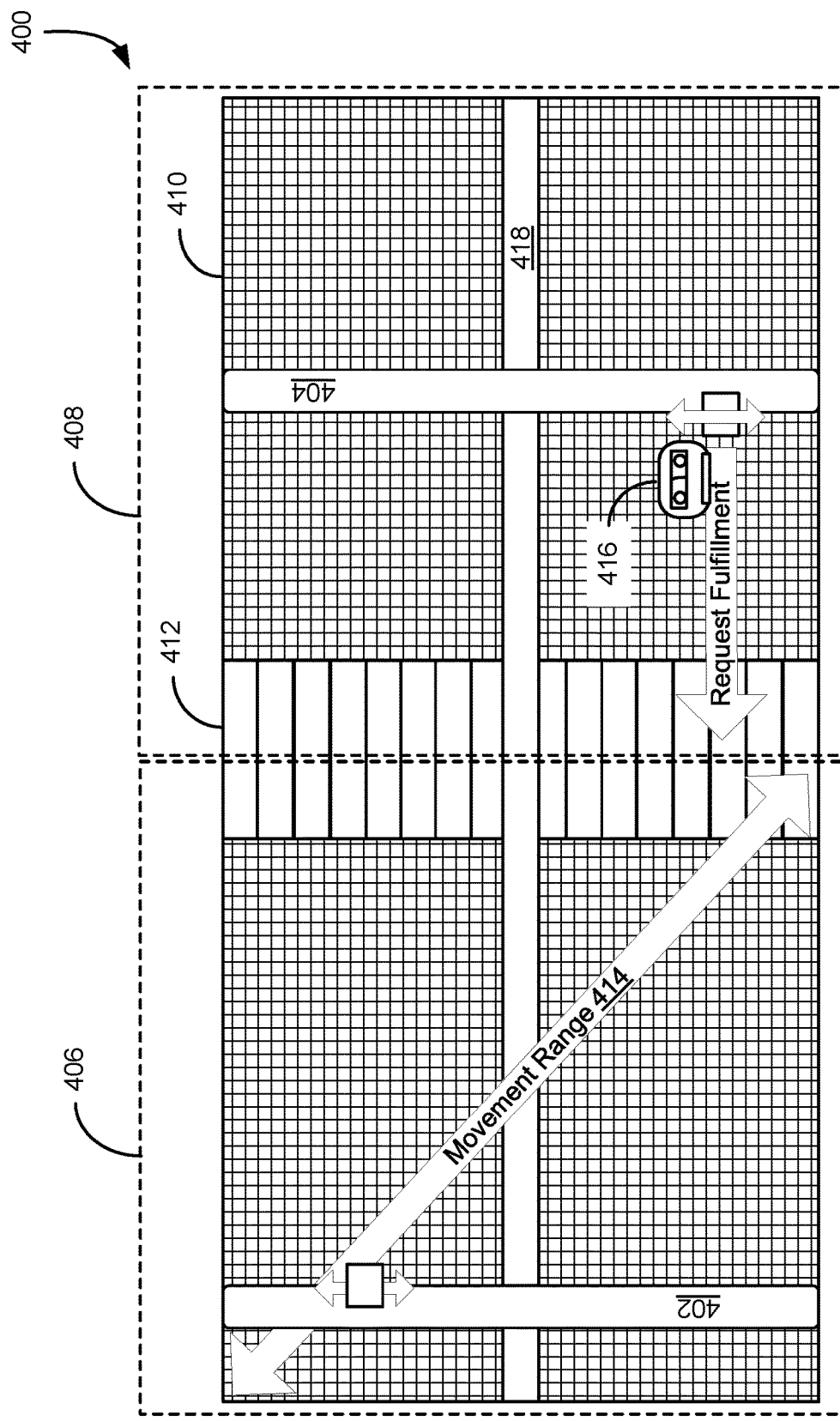
FIG. 4 shows an illustrative example of an archival data storage library in which the movement range of a first robotic device is defined based on movements being executed by a second robotic device for fulfillment of a request in accordance with at least one embodiment.

FIG. 4 shows an illustrative example of an archival data storage library 400 in which the movement range 414 of a first robotic device 402 is defined based on movements 416 being executed by a second robotic device 404 for fulfillment of a request in accordance with at least one embodiment. In the archival data storage library 400, the movements of a first robotic device 402 may be limited based on the execution of movement operations 416 by a second robotic device 404 operating within the archival data storage library 400. For instance, as illustrated in FIG. 4, if the second robotic device 404 is performing a movement operation 416 whereby the second robotic device 404 obtains an archival data storage device from a slot 410 for placement within a device data station 412, the data storage system may identify a movement zone 408 for the second robotic device 404. This movement zone 408 may define the movement range of the second robotic device 404 along the robotic device track 418 of the archival data storage library 400.

Based on the movement zone 408 for the second robotic device 404, the data storage system may determine the movement zone 406 and, hence, the movement range 414 of the first robotic device 402. For instance, because the first robotic device 402 is unable to move past the second robotic device 404 along the robotic device track 418, the movement zone 408 for the second robotic device 404 may define the limits of the movement zone 406 of the first robotic device 402. Thus, in determining whether the first robotic device 402 can execute a set of executable instructions to perform a set of operations within the archival data storage library 400, the data storage system may determine whether the executable instructions would cause the first robotic device 402 to exit the boundaries of the movement zone 406 and encroach in to the movement zone 408 of the second robotic device 404 performing its set of movement operations 416. If so, the data storage system may determine that execution of the executable instructions would result in a collision between the first robotic device 402 and the second robotic device 404. However, if the data storage system determines that the executable instructions may be executed by the first robotic device 402 within its movement zone 406 and, hence, within its movement range 414, the data storage system may cause the first robotic device 402 to execute the executable instructions and perform the set of movement operations within the archival data storage library 400.

Figure 5:
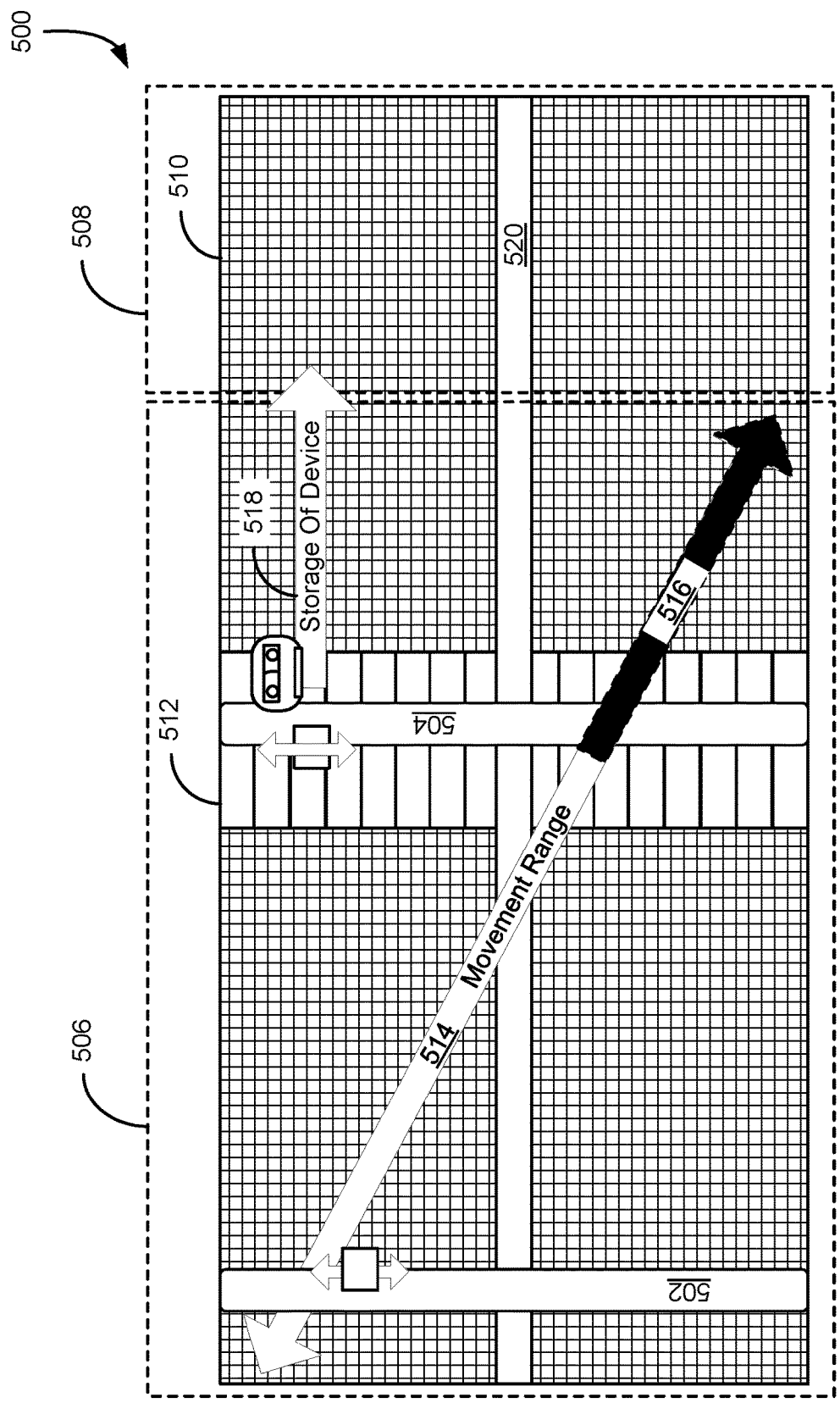
FIG. 5 shows an illustrative example of an archival data storage library in which the movement range of a first robotic device changes dynamically as a second robotic device performs movements within the archival data storage library in accordance with at least one embodiment.

FIG. 5 shows an illustrative example of an archival data storage library 500 in which the movement range 514 of a first robotic device 502 changes dynamically as a second robotic device 504 performs movement operations 518 within the archival data storage library 500 in accordance with at least one embodiment. In the archival data storage library 500, the movement zone 506 and, hence, the movement range 514 of a first robotic device 502 may expand or contract based on the movement operations being performed by a second robotic device 504 within the archival data storage library 500. For instance, as illustrated in FIG. 5, the second robotic device 504 may perform a set of movement operations that may cause the second robotic device 504 to move towards the rightmost edge of the archival data storage library 500. These movement operations may be associated with the removal of an archival data storage device from a device data station 512 to an slot 510 located within the movement zone 508 of the second robotic device 504.

As the second robotic device 504 moves along the robotic device track 520 from the device data station 512 to a slot 510 in the movement zone 508 of the second robotic device 504, the data storage system of the archival data storage library 500 may determine that the movement zone 508 of the second robotic device 504 is decreasing in size. That is, since the second robotic device 504 is moving rightward towards the slot 510, the leftmost edge of the second robotic device 504 may define the leftmost outward boundary of the movement zone 508. As a result, the data storage system may determine that the movement range 514 of the first robotic device 502 increases to a new movement range 516 corresponding to the location of the second robotic device 504 upon completion of its movement operation 518. This new movement range 516 may define a new movement zone 506 for the first robotic device 502, which may now be larger than an original movement zone defined prior to initialization of the movement operation 518 by the second robotic device 504.

The continuous evaluation of movement operations performed by the robotic devices 502, 504 within the archival data storage library 500 enables the data storage system to dynamically determine the range of movement operations that a robotic device may perform while other robotic devices perform other movement operations within the archival data storage library 500. This may enable the data storage system to determine if execution of a set of executable instructions for fulfillment of a request may result in a collision within the archival data storage library 500. It should be noted that the examples described above in connection with FIGS. 4 and 5 are meant to be illustrative and other movement operations and scenarios may occur. For instance, the second robotic device 504 may expand its own movement zone 508 through movement past the device data stations 512 to obtain an archival data storage device from an slot 510. This may cause the movement zone 506 of the first robotic device 502 to shrink at the rate in which the movement zone 508 is expanding with the movement of the second robotic device 504 along the robotic device track 520. It should be noted that the movement zones 506, 508 illustrated in FIGS. 4 and 5 may also assume other shapes based on the possible movements of the robotic devices 502, 504 and the configuration of the robotic devices 502, 504 and robotic device tracks 520 within the archival data storage library 500. For example, if a robotic device may pass over or under another robotic device, the movement zone for this robotic device may be L-shaped based on whether the robotic device can pass over or under the other robotic device.

Figure 6:
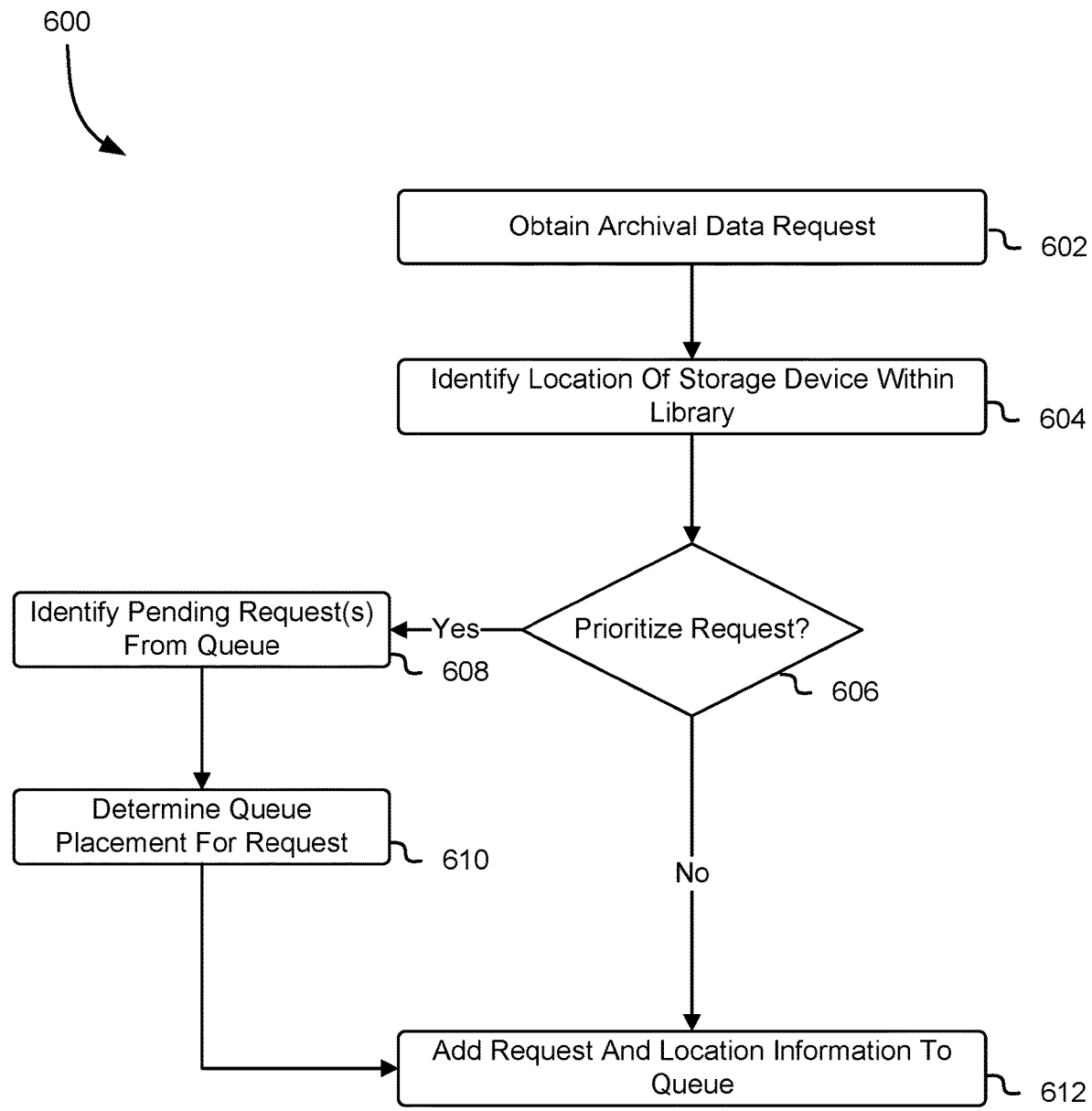
FIG. 6 shows an illustrative example of a process for adding an archival data request and information specifying a location of an archival data storage device to a queue usable by a robotic device command module to determine movement operations of robotic devices of an archival data storage library in accordance with at least one embodiment.

FIG. 6 shows an illustrative example of a process 600 for adding an archival data request and information specifying a location of an archival data storage device to a queue usable by a robotic device command module to determine movement operations of robotic devices of an archival data storage library in accordance with at least one embodiment. The process 600 may be performed by the request processing sub-system of the archival data storage service. At any time, the request processing sub-system may obtain 602 an archival data request from a client device utilized by a customer of the archival data storage service. The archival data request may be for retrieval of data from one or more archival data storage devices of an archival data storage library managed by the archival data storage service. The request may specify an identifier corresponding to the data that is to be retrieved and/or identifiers corresponding to the one or more archival data storage devices that have the data stored therein. Alternatively, the archival data storage request may be for storage of data within the archival data storage library.

In response to the archival data request, the request processing sub-system may identify 604 the location of the archival data storage devices within the archival data storage library that are to be used to either retrieve the requested data or to store the data provided in the request. For instance, the request processing sub-system may query, using the identifiers specified in the request, a database to identify entries corresponding to the data to be retrieved. These entries may specify identifiers corresponding to the archival data storage devices utilized for storage of the data indicated in the request. Alternatively, if the request is to store data within the archival data storage library, the request processing sub-system may identify one or more archival data storage devices that may be used for storage of the data. For instance, the request processing sub-system may select one or more archival data storage devices based on various criteria including, but not limited to: proximity to other archival data storage devices used to store data of the customer, available storage capacity within the archival data storage devices, redundancy required to avoid correlated failures, and the like. The request processing sub-system may identify the physical location of these archival data storage devices within the archival data storage library.

The request processing sub-system may also evaluate the obtained archival data request to determine 606 whether prioritization of the request within the queue is required. For instance, a customer may specify, in the archival data request, that the request is to be fulfilled within a particular period of time. If prioritization of the request is required, the request processing sub-system may identify 608 any other pending requests from within the queue to determine 610 a placement for the obtained archival data request within the queue. The request processing sub-system may determine whether any of the other pending requests in the queue are subject to any prioritization requirements. Based on the prioritization requests, if any, of the other pending requests in the queue, the request processing sub-system may determine where in the queue the request may be placed such that the request may be processed in accordance with its prioritization requirements.

If prioritization of the request is not required or the request processing sub-system has determined a placement for the request in the queue based on the prioritization requirements of the request, the request processing sub-system may add 612 the request and location information for archival data storage devices to be utilized for fulfillment of the request to the queue. For instance, if the request is not subject to any prioritization requirements, the request processing sub-system may add the request to the queue subject to a FIFO sorting of requests within the queue. Alternatively, if the request is subject to one or more prioritization requirements, the request processing sub-system may add the request in the queue according to the placement determination made by the request processing sub-system based on the prioritization requirements of the request and of other requests in the queue.

Figure 7:
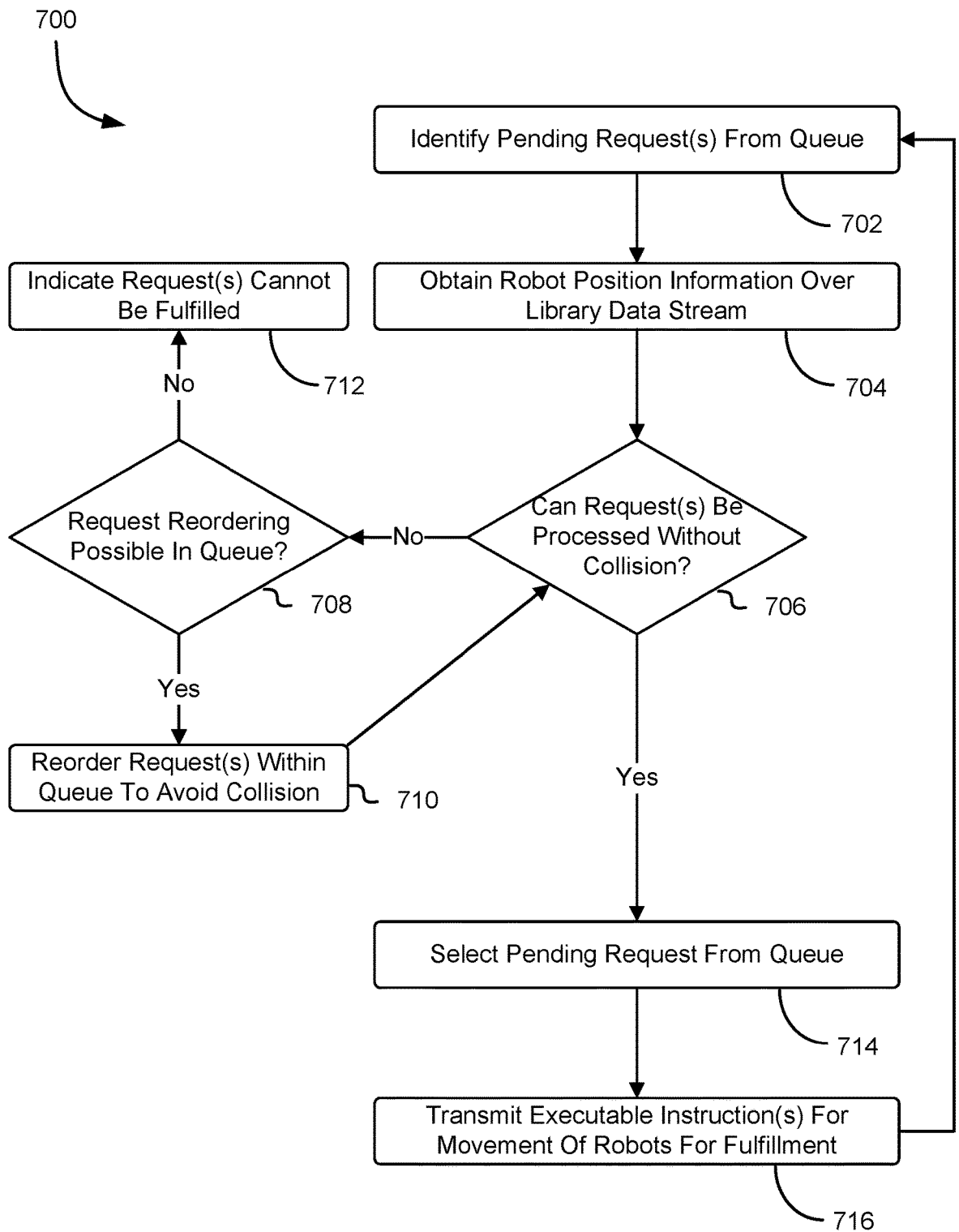
FIG. 7 shows an illustrative example of a process for generating and transmitting executable instructions to a computing system of an archival data storage library based on an evaluation of pending requests specified in a queue of the archival data storage service in accordance with at least one embodiment.

FIG. 7 shows an illustrative example of a process 700 for generating and transmitting executable instructions to a computing system of an archival data storage library based on an evaluation of pending requests specified in a queue of the archival data storage service in accordance with at least one embodiment. The process 700 may be performed by a robotic device command module of the archival data storage service, which may process requests from the queue and transmit executable instructions to the data storage system of the archival data storage library for fulfillment of the requests. In an embodiment, the robotic device command module identifies 702, from the queue, a pending request for performance of an archival data operation using archival data storage devices of the archival data storage library. For instance, the robotic device command module may query the queue to identify the request that is to be processed based on the prioritization requirements of the request and/or the time at which the request was submitted to the archival data storage service. The request may include identifiers corresponding to the archival data storage devices that are to be used in performance of the archival data operation specified in the request. In some instances, the robotic device command module may also obtain, from the queue, location information for the archival data storage devices that are to be used in performance of the archival data operation. This location information may include identifiers corresponding to the slots of the archival data storage library where the archival data storage devices are stored when not being utilized by a device data reader.

As noted above, the robotic device command module may maintain a communications channel with the data storage system through which the data storage system may stream information specifying the location of each of the myriad archival data storage devices within the library as the robotic devices operating within the library execute various operations. The data storage system may also provide, through this data stream, the position for each robotic device as it moves within the library. Thus, the robotic device command module may obtain 704, through this data stream, robot position information, as well as the location of the archival data storage devices to be used for fulfillment of the request. Using the information obtained through the data stream, the robotic device command module may determine 706 whether the request can be processed without causing a collision among the robotic devices of the library. For instance, the robotic device command module may select a robotic device and simulate execution of a set of movement operations by the robotic device for fulfillment of the request. Using these movement operations, as well as an area of potential collision defined through movement operations of the other robotic device operating concurrently in the library, the robotic device command module may determine whether execution of any of these movement operations would result in the robotic device colliding with the other robotic device as the other robotic device performs its movement operations.

If the robotic device command module determines that the request cannot be processed without causing a collision among the robotic devices of the library, the robotic device command module may determine 708 whether a reordering of the requests within the queue is possible. For instance, the robotic device command module may determine whether the request is subject to one or more prioritization requirements, whereby the request is to be processed within a particular period of time defined by a requestor. Based on any of these prioritization requirements, the request processing command module may determine whether the request can be re-added to the queue at a position whereby the request may be processed again at a later time. If the robotic device command module determines that the request cannot be re-added to the queue for processing at a later time, the robotic device command module may indicate 712, to the request processing sub-system of the archival data storage service, that the request cannot be fulfilled in accordance with its prioritization requirements. However, if the robotic device command module determines that the request can be re-added to the queue for processing at a later time, the robotic device command module may reorder 710 the requests in the queue and select another request for processing. The robotic device command module may evaluate this newly selected request to determine 706 whether it can be processed without causing a collision among the robotic devices.

In an embodiment, the robotic device command module can alter or modify a request if a determination is made that the request cannot be fulfilled as submitted. For instance, if the request is to store data within the archival data storage library, and the robotic device command module determines that the request cannot be fulfilled using a particular data storage device within the library because movements required to access the data storage device and utilize the data storage device would result in a collision, the robotic device command module may alter the request by selecting another data storage device that can be used to fulfill the request and that movements of a robotic device for accessing and using the data storage device would not result in a collision within the archival data storage library. As another example, the robotic device command module may modify a request to change the storage location (e.g., slot) to be used in performance of the tasks specified in the request. Thus, rather than reordering the requests as described above, the robotic device command module may determine whether the request may be altered based on the movements of the robotic devices within the library.

In another embodiment, the robotic device command module can generate a new request that can be fulfilled by the robotic device to optimize the performance of the robotic devices within the archival data storage library. For instance, the robotic device command module may generate a request that may cause a robotic device to cluster data storage devices within the archival data storage library in a particular location (e.g., upper left corner of the library, lower right corner of the library, etc.) in order to reduce the likelihood of a potential robotic device collision within the library. Alternatively, the robotic device command module may generate a new request to cause a robotic device to move data storage devices to storage locations that are closer to the device data readers in order to decrease the latency in performing read/write operations. Similarly, the robotic device command module may generate a new request to move more frequently used data storage devices to storage slots that are closer to the device data readers.

If the robotic device command module determines that the selected request can be processed without causing a collision among the robotic devices of the library, the robotic device command module may select 714 the request from queue (e.g., removing the request from the queue for processing) and transmit 716 executable instructions to the data storage system of the library to cause a robotic device to perform various movement operations for fulfillment of the request. These movement operations may be associated with obtaining an archival data storage device from an slot, placing the archival data storage device into a device data reader, and returning to another position within the library.

Figure 8:
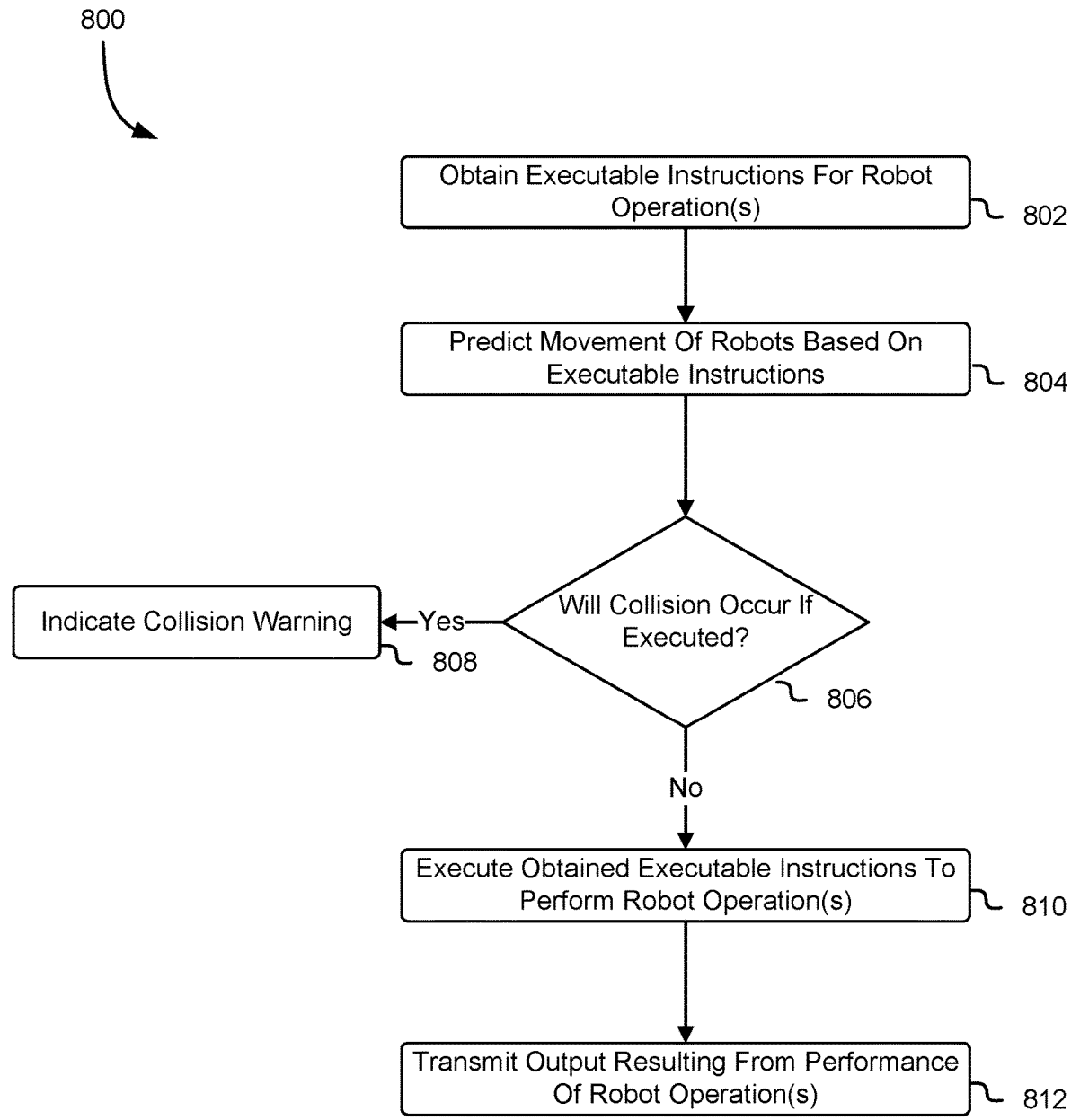
FIG. 8 shows an illustrative example of a process for evaluating executable instructions obtained from a robotic device command module to determine whether execution of the executable instructions would result in a collision in accordance with at least one embodiment.

FIG. 8 shows an illustrative example of a process 800 for evaluating executable instructions obtained from a robotic device command module to determine whether execution of the executable instructions would result in a collision in accordance with at least one embodiment. The process 800 may be performed by the data storage system of the archival data storage library, which may evaluate incoming executable instructions from a robotic device command module to determine whether these executable instructions may be executed without causing a collision among the various robotic devices of the library. Alternatively, the process 800 may be performed by the robotic device command module itself, whereby the robotic device command module may execute the executable instructions on a robotic device by transmitting these executable instructions directly to the robotic device. At any time, the data storage system may obtain 802 executable instructions from the robotic device command module to cause a robotic device to perform various movement operations associated with an archival data storage operation.

In response to obtaining the executable instructions from the robotic device command module, the data storage system may predict 804 the movements of the robotic devices within the library if the executable instructions were to be executed by a robotic device. For instance, the data storage system may select a robotic device and simulate execution of a set of movement operations by the robotic device for fulfillment of the request. This process may be similar to that performed by the robotic device command module, as described above in connection with FIG. 7. The data storage system may also simulate the movements of the other robotic devices within the library as the robotic device executes the executable instructions. Based on this simulation, the data storage system may determine 806 whether a collision would occur if the executable instructions were to be executed by a robotic device.

If the data storage system determines that execution of the executable instructions would result in a collision among the robotic devices of the archival data storage library, the data storage system may indicate 808 a collision warning regarding the possible collision. For instance, the data storage system may transmit a notification to the robotic device command module to indicate that execution of the executable instructions would cause a collision to occur within the library. This may cause the robotic device command module to determine whether it can re-add the request to the queue, as described above in connection with FIG. 7. However, if the data storage system determines that execution of the executable instructions may be performed without causing a collision among the various robotic devices, the data storage system may execute 810 the obtained executable instructions to cause a robotic device to perform the various movement operations associated with the archival data operation of the request. The data storage system may obtain, as a result of execution of the executable instruction, output from performance of the archival data operation, which the data storage system may transmit 812 to the robotic device command module for fulfillment of the request.

Figure 9:
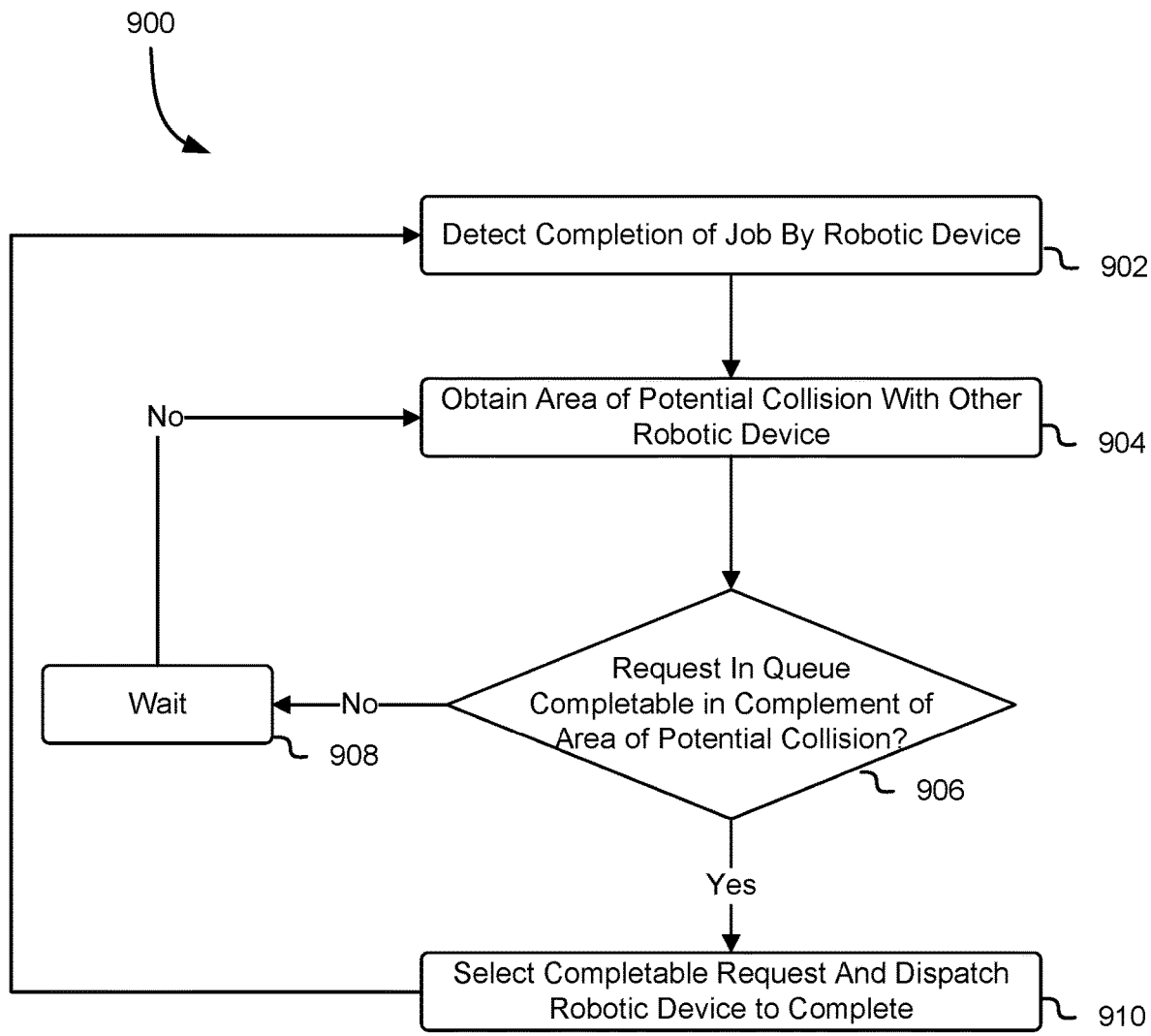
FIG. 9 shows an illustrative example of a process for selecting a completable request from a queue maintained by the archival data storage service based on a determination as to whether the request can be completed without a collision in accordance with at least one embodiment.

FIG. 9 shows an illustrative example of a process 900 for selecting a completable request from a queue maintained by the archival data storage service based on a determination as to whether the request can be completed without a collision in accordance with at least one embodiment. The process 900 may be performed by the robotic device command module in response to receiving an indication, from the data storage system, that a robotic device of the library has completed a job (e.g., movement operations associated with a prior request). As described above, the robotic device command module may maintain a communications channel with the data storage system, through which the robotic device command module may process an incoming data stream corresponding to data being provided through the processing of archival data storage devices, as well as other information usable to determine the operations of the robotic devices within the library. Through this data stream, the robotic device command module may detect 902 completion of a job by a robotic device operating in the library.

In response to detecting that a robotic device has completed a job within the library, the robotic device command module may obtain 904 the area of potential collision with other robotic devices. This area of potential collision may be defined through evaluation of the position and pending movement operations of these other robotic devices. For instance, a robotic device may be unable to move past the position of another robotic device without resulting in a collision. Thus, using the position of the other robotic devices within the library and their pending movement operations, the robotic device command module can define this area of potential collision.

Based on the parameters of the request and the obtained area of potential collision, the robotic device command module may determine 906 whether the request is completable in complement of the area of potential collision. For instance, the robotic device command module may simulate execution of the executable instructions by the robotic device, as well as the movements of the other robotic devices, to determine whether a collision would occur in the area of potential collision. If so, the robotic device command module may wait 908 for the other robotic devices to perform additional movement operations and obtain 904 a new area of potential collision. However, if the request is completable in complement of the area of potential collision, the robotic device command module may select 910 the request from the queue and dispatch the robotic device to execute the executable instructions. The process for selecting the request and transmitting the executable instructions for execution by the robotic device may be similar to that described above in connection with FIG. 7. Thus, as jobs are completed by the robotic devices of the library, the robotic device command module may continue to transmit executable instructions for fulfillment of requests from the queue concurrently with operations performed by other robotic devices in the library.

Figure 10:
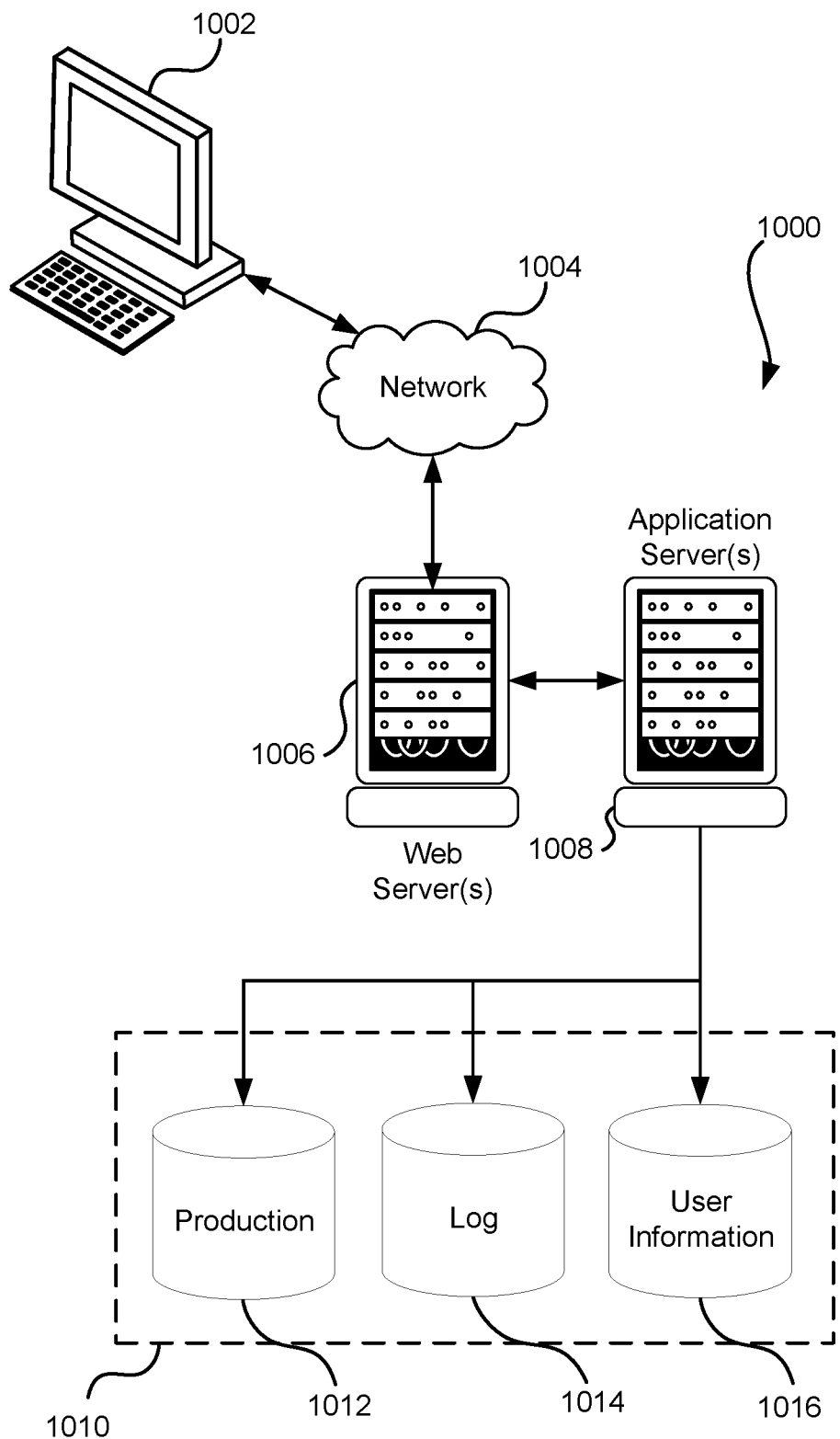
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    dispatching a first robotic device of an archival data storage library to perform a first task comprising moving a first data storage tape from a first slot of a plurality of slots of the archival data storage library to a first tape drive of the archival data storage library;
    determining, based on the first task, a subset of the plurality of slots to avoid a collision between the first robotic device and a second robotic device of the archival data storage library to be dispatched to perform a second task;
    selecting, from a plurality of tasks to be performed in the archival data storage library, a second task to be performed by the second robotic device, the second task able to be performed by the second robotic device without causing the collision; and
    dispatching the second robotic device to perform the second task while the first robotic device is in process of performing the first task.

2. The computer-implemented method of claim 1, wherein:
    the second task is selected from a queue organized based at least in part on prioritization of tasks; and
    the second task is selected further based on a respective priority in the queue.

3. The computer-implemented method of claim 1, further comprising altering the second task to enable the second task to be performed by the second robotic device without causing the collision.

4. The computer-implemented method of claim 1, wherein the method further comprises:
    detecting that the first robotic device has completed performance of the first task;
    selecting, from the plurality of tasks, a third task to be performed by the first robotic device such that the third task is completable by the first robotic device without colliding with the second robotic device; and
    dispatching the first robotic device to perform the third task while the second robotic device is in process of performing the second task.

5. A system, comprising:
    one or more processors; and
    memory that stores computer-executable instructions that, if executed, cause the system to:
        dispatch a first robotic device of a data storage library to perform a first task comprising moving a first data storage medium from a first location of the data storage library to a second location of the data storage library;
        determine a second task to be performed by a second robotic device, the second task determined such that the second task is performable by the second robotic device without the first robotic device causing delay of the second task by the second robotic device; and
        while the first robotic device is performing the first task, dispatch the second robotic device to perform the second task.

6. The system of claim 5, wherein the second task comprises moving a second data storage medium from a third location of the data storage library to a fourth location of the data storage library.

7. The system of claim 5, wherein:
    the first robotic device and the second robotic device traverse through the data storage library on a track along an axis; and
    the computer-executable instructions that cause the system to determine the second task to be performed by the second robotic device further cause the system to evaluate first movements of the first robotic device along the track and second movements of the second robotic device along the track to determine whether performance of the first movements and of the second movements cause the delay of the second task.

8. The system of claim 5, wherein the computer-executable instructions that cause the system to determine the second task further cause the system to determine the second task based on a respective priority from a queue organized based on prioritization of tasks.

9. The system of claim 5, wherein the computer-executable instructions further cause the system to:
    detect completion of the first task;
    determine a third task to be performed by the first robotic device, the third task determined such that the third task is performable by the first robotic device without the second robotic device causing delay of the third task by the first robotic device; and
    while the second robotic device is performing the second task, dispatch the first robotic device to perform the third task.

10. The system of claim 5, wherein the computer-executable instructions that cause the system to determine the second task further cause the one or more processors to:
    select the second task;
    determine that the second task cannot be performed by the second robotic device without the first robotic device causing delay of the second task by the second robotic device; and
    modify the second task to enable the second task to be performed by the second robotic device without the first robotic device causing the delay of the second task by the second robotic device.

11. The system of claim 5, further comprising:
    the first robotic device;
    the second robotic device; and
    a shelf comprising:
        a set of data storage slots, wherein the first location is a data storage slot of the set of data storage slots; and
        a set of drives, wherein the second location is a drive of the set of drives.

12. The system of claim 5, wherein:
    the first location is a drive;
    the second location is a first data storage slot located on a first side of the drive; and
    the second task comprises loading the second data storage medium on to the drive from a second data storage slot located on a second side of the drive.

13. A non-transitory computer-readable storage medium storing thereon executable instructions that, as a result of being executed by one or more processors of a computer system, cause the computer system to at least:
- store a plurality of tasks to perform in a data storage library comprising a first robotic device and a second robotic device;
- determine, from the plurality of tasks, a second task for the second robotic device to perform while the first robotic device is performing a first task, the second task determined based on a set of locations of the first robotic device while performing the first task; and
- cause the second robotic device to begin performance of the second task while the first robotic device is in process of performing the first task.

14. The non-transitory computer-readable storage medium of claim 13, wherein the instructions that cause the computer system to store the plurality of tasks further cause the computer system to organize the plurality of tasks based at least in part on a set of priority requirements for individual tasks of the plurality of tasks.

15. The non-transitory computer-readable storage medium of claim 14, wherein the instructions further cause the computer system to determine the second task based on a respective priority of the second task within the plurality of tasks.

16. The non-transitory computer-readable storage medium of claim 13, wherein:
- the set of locations of the first robotic device comprise a drive of the data storage library and a data storage slot of the data storage library located at a first side of the drive;
- the first task includes moving a data storage medium from the drive to the data storage slot; and
- the second task is determined as a result of the first robotic device executing the first task within the first side of the drive and the second task being for operation of the second robotic device on a second side of the drive.

17. The non-transitory computer-readable storage medium of claim 13, wherein the instructions further cause the computer system to:
- detect completion of the first task by the first robotic device;
- determine, from the plurality of tasks, a third task for the first robotic device to perform while the second robotic device is performing the second task, the third task determined based on a second set of locations of the second robotic device while performing the second task; and
- cause the first robotic device to begin performance of the third task while the second robotic device is in process of performing the second task.

18. The non-transitory computer-readable storage medium of claim 13, wherein the first robotic device and the second robotic device are capable of traversing overlapping areas of the data storage library.

19. The non-transitory computer-readable storage medium of claim 13, wherein:
- the first task comprises moving a first data storage medium from a first drive of the data storage library to a first slot of the data storage library; and
- the second task comprises moving a second data storage medium from a second slot of the data storage library to a second drive of the data storage library.

20. The non-transitory computer-readable storage medium of claim 13, wherein the instructions that cause the computer system to determine the second task further cause the computer system to exclude a third task commanded to be performed prior to the second task.

* * * * *